April 26, 1955
H. C. GLITSCH
2,707,025
ADJUSTABLE SHEARING DEVICE
Filed April 22, 1952
2 Sheets-Sheet 1
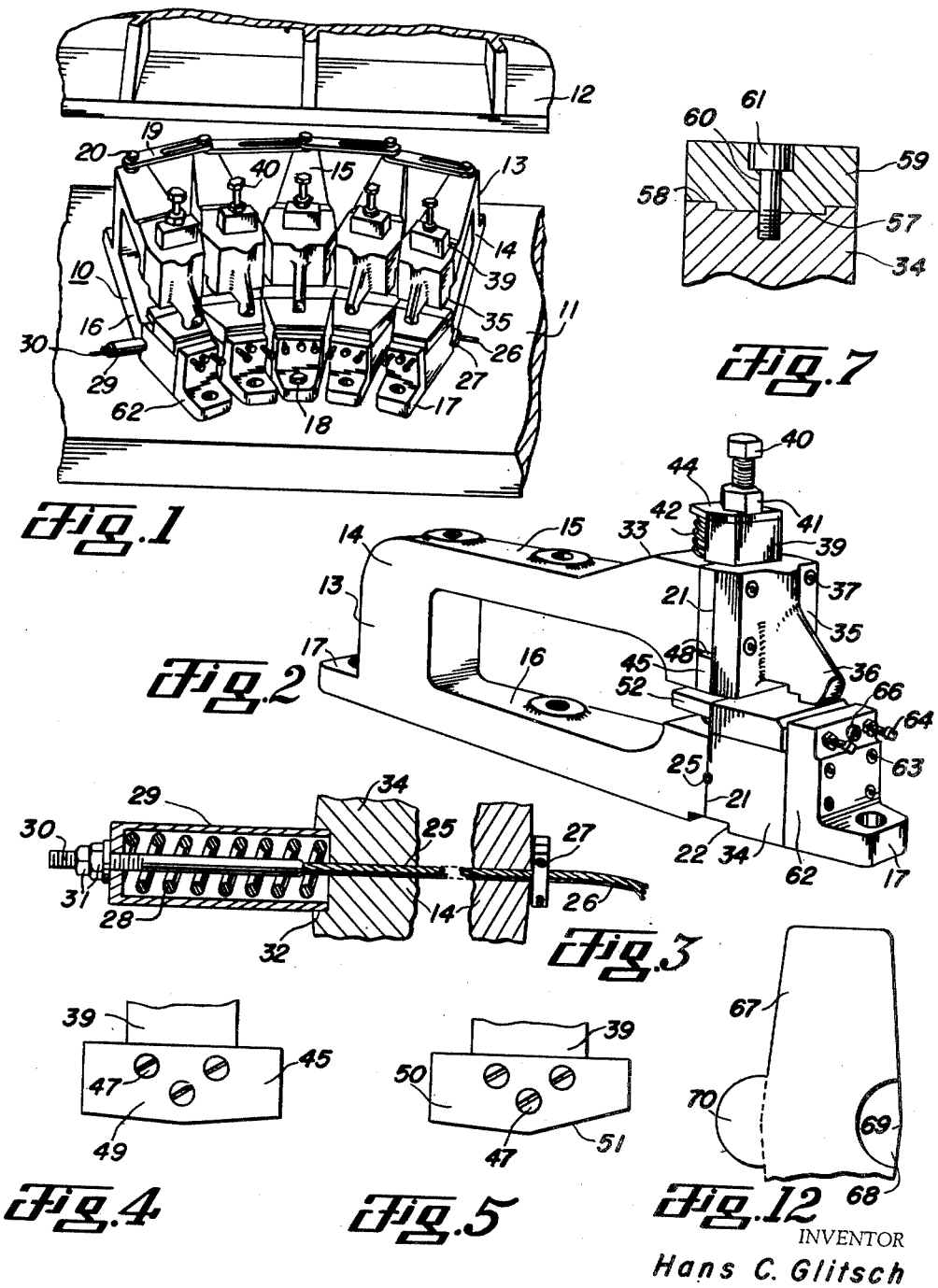
INVENTOR
Hans C. Glitsch
BY *Ahley & Ahley*
ATTORNEYS

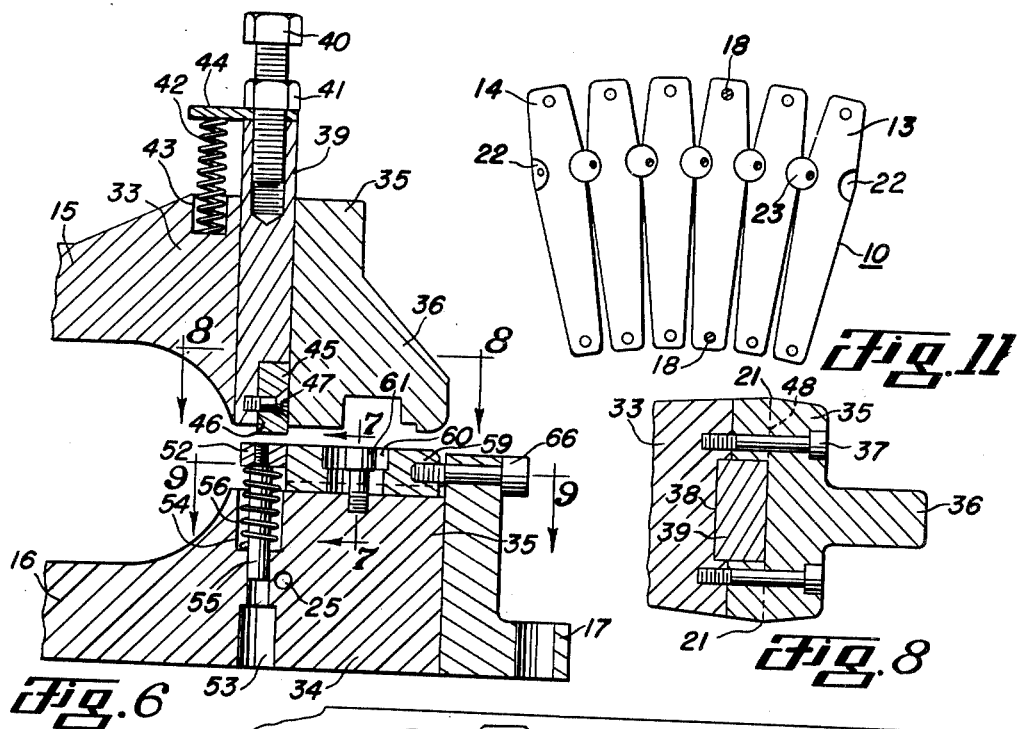
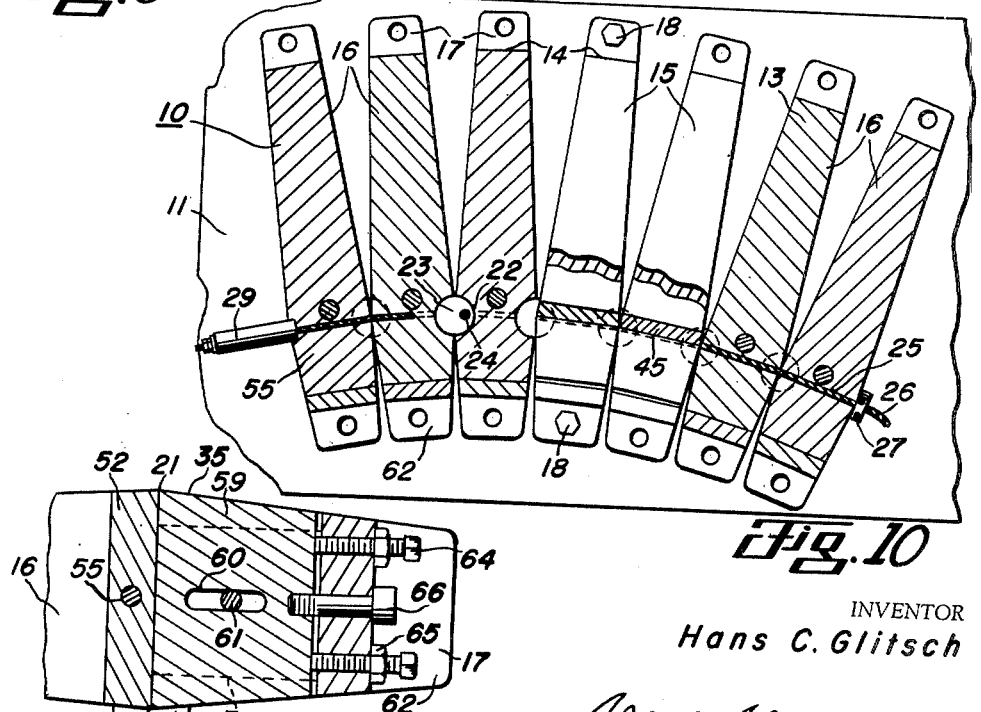

United States Patent Office 2,707,025
Patented Apr. 26, 1955

2,707,025

ADJUSTABLE SHEARING DEVICE

Hans C. Glitsch, Dallas, Tex., assignor, by mesne assignments, to Fritz W. Glitsch & Sons, Inc., Dallas, Tex., a corporation of Delaware Application April 22, 1952, Serial No. 283,686

7 Claims. (Cl. 164—47)

This invention relates to new and useful improvements in shearing devices and more particularly to an adjustable shearing device.

One object of the invention is to provide an improved device for shearing sheet metal and plates having a plurality of adjustable, coacting blades whereby the shape of the cut produced by the shearing action of the blades may be varied.

A particular object of the invention is to provide an improved shearing device which includes a plurality of units having individual shearing blades coacting with adjacent blades and wherein the units are connected so as to be adjustable for varying the shape of the shear cut without affecting the coaction of the blades and the continuity of said shear cut.

An important object of the invention is to provide an improved shearing device, of the character described, wherein the ends of the blades are engaged and alined with the ends of the adjacent blades and wherein the adjustable connections of adjacent units are alined with the alined ends of their blades whereby a continuous shear cut is assured irrespective of the adjustment of the angular relation of the blades to said units.

Another object of the invention is to provide an improved shearing device, of the character described, wherein the units are constructed and connected in such manner that the line of the shear may be varied between substantially concave, substantially convex, straight and undulating.

A construction designed to carry out the invention will be hereinafter described together with other features of the invention.

The invention will be more readily understood from a reading of the following specification and by reference to the accompanying drawings, wherein examples of the invention are shown, and wherein:

Fig. 1 is a perspective view of a shearing device, constructed in accordance with the invention, shown mounted on the bed of a press, Fig. 2 is a perspective view of one of the units of the device, Fig. 3 is an enlarged, horizontal, cross-sectional view, illustrating the cable for securing the forward portions of the units together, Fig. 4 is a transverse, vertical, sectional view, showing the blade of one of the units in elevation, Fig. 5 is a view, similar to Fig. 4, of the blade of one of the end units, Fig. 6 is an enlarged, vertical, sectional view of the forward portion of one of the units, Fig. 7 is a transverse, vertical, sectional view, taken on the line 7—7 of Fig. 6, Figs. 8 and 9 are horizontal, cross-sectional views, taken on the lines 8—8 and 9—9, respectively of Fig. 6, Fig. 10 is a top plan view, largely in section, of the device mounted on the press bed, Fig. 11 is a reduced, underside plan view of a portion of the device with its units adjusted to another position, and Fig. 12 is an underside plan view of a portion of a unit having a modified connecting element.

In the drawings, the numeral 10 designates a shearing device mounted upon the bed 11 of a press having a press bar or ram 12 reciprocal vertically relative to said bed. The shearing device 10 includes a plurality of individual punch units 13 adapted to be actuated simultaneously by the press bar 12 for shearing sheet metal and plates. As will be explained hereinafter, the punch units 13 are connected so as to be adjustable relative to one another for varying the shape or contour of the shear cut without affecting the continuity of said shear cut. Each unit includes a substantially U-shaped body or bracket 14 having horizontal arms or legs 15 and 16 disposed in vertical alinement. Apertured lugs 17 project from the ends of the lower arm 16 and bolts 18 extend through the lugs of one or more of the bodies 14, preferably one of the center bodies, for fastening the same to the press bed 12 (Figs. 1, 10 and 11). The inner or rear ends of the upper arms 15 are adjustably fastened together by slotted links 19 and screws 20.

As is most clearly shown in Figs. 10 and 11, the longitudinal margins or sides of each body are non-parallel and converge from intermediate, alined pivot points 21 adjacent the forward end of the body toward the ends thereof. Thus, the ends of each body are of less widths than its intermediate portion and permit adjustment of the angular relation of the body relative to adjacent bodies by swinging said body about its pivot points 21. A recess 22 is formed in each longitudinal margin of the lower arm 16 at its lower edge portion and has an upright, semi-circular surface swung about a vertical axis alined and coincident with the pivot point of the margin. The recesses 22 of adjacent bodies coact to form a socket for a circular pivot element or button 23 which, if desired, may be fastened in one of said recesses by a suitable screw 24 and which has its axis in vertical alinement and coinciding with the pivot points 21 of the contiguous margins of the bodies. Due to the coaction of the sockets and pivot elements 23, the units are adjustably joined or connected and may be swung about the axes of said sockets and pivot elements which coincide with the pivot points.

As is most clearly shown in Figs. 2, 3 and 10, a horizontal opening 25 extends transversely through the lower arm in alinement with the pivot points of its body for receiving a flexible cable 26 having a clamp 27 adjustably fixed thereon and adapted to bear against the outer margin of one of the end units. A coiled spring 28 is confined upon the opposite end of the cable 26 by a cylindrical housing or cap member 29 and a screw-threaded rod 30 attached to said cable end. The rod 30 projects through the closed outer end of the housing 29 and has suitable nuts 31 threaded thereupon. In order to provide a seat for the inner ends of the spring 29 and its housing, a concentric counterbore or recess 32 surrounds the outer end of the opening 25 of the adjacent or opposite end unit. Thus, the forward or outer ends of the units are secured against displacement but said units may be adjusted relative to one another.

A punch holder or support 33 is provided at the outer or forward end of the upper arm 15 in overlying relation to a die holder or shoe 34 at the outer end of the lower arm. The punch holder 33 includes a cap or cover plate 35, having a forwardly-extending guide nose 36, overlying and secured to its forward surface by countersunk screws 37. As shown in Figs. 6 and 8, an upright coextensive channel or groove 38 is formed in the contiguous faces of the holder and its cap plate 35 for slidably receiving a punch or slide bar 39 which has its upper end projecting above said holder. The punch 39 is adapted to be depressed and projected from the lower end of the holder by the press bar 12 and has an upstanding bolt 40 screw-threaded in its upper end and locked in adjusted positions by a nut 41 for engagement by said press bar. A coiled lifter spring 42 is confined between a recess 43 in the upper surface of the holder and an overlying lug plate 44 carried by the bolt 40 between the nut 41 and the upper end of the punch, whereby said punch is held in a raised position by the spring.

For supporting a shearing blade 45, the punch has a flange 46 depending from the rear portion of its lower end and suitable countersunk screws 47 secure the blade to the flange. The blade 45 extends below the flange 46 and is of a width greater than the width of the punch so as to project laterally thereof (Fig. 4) and the shearing edge of each blade has its ends in alined engagement with the ends of the shearing edges of the blades of adjacent units. Recesses 48 for accommodating the blade are formed in the cap plate 35 laterally of and in communication with the lower end of the channel 38 (Fig. 2). As shown by the numeral 49 in Fig. 4, the shearing edge or lower end of the blade is bevelled or inclined laterally upward from its center to its ends in order to reduce the shear load imposed on said blade. Each of the end units has a modified blade 50 wherein the bevel or inclination of the outer end portion 51 of its shearing edge or lower end is increased to permit the ends of the shear to fade out. It is noted that the forward surfaces of the channel 38, punch element 39, blade 45 and recesses 48 are in vertical alinement with the pivot points 21, whereby the adjacent ends of the shearing edges of the blades of adjacent units stay in alined engagement irrespective of the adjustment of said units.

The die holder 34 includes a transverse, stripper pad or bar 52 underlying and in substantially vertical alinement with the shearing blade. An upright bore 53, having a counterbore 54 at its upper end, is formed in the rear portion of the die holder to receive a guide rod 55 for the stripper pad 52 and a coiled lifter spring 56 is confined upon the rod in the counterbore so as to resiliently support said pad (Fig. 6). The upper surface of the die holder has its forward portion grooved longitudinally as shown by the numeral 57 to provide external, parallel ways 58 (Fig. 7). An adjustable, complementary die 59 is slidably supported upon the ways 58 and has a longitudinal shouldered slot 60 for receiving a countersunk screw 61 projecting uprightly from the groove portion 57, whereby the die is movable toward and away from the stripper pad and the alined blade. For adjusting the die 59, a cap or cover plate 62 overlies the front end of the die holder and is secured thereto by countersunk screws 63 and the front lug 17 is made integral with the cover plate. A pair of adjusting screws 64, having lock nuts 65, are screw-threaded in the cover plate 62 so as to bear against the front end of the die for pulling said die forwardly. As shown in Fig. 9, the die is urged rearwardly by a set screw 66 extending through the cover plate and screw-threaded in said die. Due to the adjusting and set screws 64 and 66, the die may be accurately adjusted to position and maintain its rear end or shear surface in substantially vertical alinement with the shearing edge of the blade.

If desired, the pivot element or button may be made integral with one of the adjacent units instead of being formed integrally. A unit having a slightly modified body 67 is shown in Fig. 12 and a recess 68, identical to the recesses 22, is formed in one side of the body with its semi-circular, upright wall swung in an arc about a vertical axis coinciding with the pivot point 69 of the side. A pivot element or lug 70 projects laterally from the opposite side of the body 67 and has an upright, semi-circular surface swung in an arc about a vertical axis coincident with the pivot point of said opposite side. The remainder of the body is identical to the body 14.

From the foregoing, it is apparent that a shearing device of economical and simple construction has been provided and that the device may be readily adjusted. By loosening the screws 20, the units may be swung upon their pivot elements 23 about the pivot points 21 relative to one another, whereby their blades 45 may describe a substantially convex (Fig. 10), substantially concave (Fig. 11), straight or undulating line (not shown). Due to the provision of the pivot elements 23 and the vertical alinement of their axes with the ends of the shearing edges of the blades, the alined, contiguous relation of said blade ends is maintained to preserve the continuity of the shear line irrespective of the adjustment of the units about their pivot points. Although each blade shears in a straight line, the blade is of relatively narrow width whereby a substantially arcuate shear cut may be formed by a plurality of coacting blades. It is contemplated that a series of identical shearing actions will be required to shear a relatively wide sheet or plate and that it is not necessary to increase the number of units. Bending or tearing of the sheet or plate is prevented by the increased bevel of the outer end portion of the blade shearing edge of each end unit which permits fading of the ends of each shear cut. Manifestly, the mounting and connection of the units facilitate adjustment thereof.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A shearing device including, a plurality of units disposed in side-by-side relationship, an individual shearing blade reciprocably mounted in each unit, a die adjustably mounted in each unit and having a surface alined and coacting with the shearing blade, and pivotal connecting means between and adjustably connecting adjacent units with the adjacent ends of their blades and dies in alinement and substantially in engagement, each connecting means being alined with the alined and substantially engaged blade and die ends of adjacent units whereby said units may be adjusted to vary the angular relation of their blades and dies without misalining or substantially disengaging said blade ends, each unit having at least one end portion of a width less than the length of its blade and die to permit adjustable movement of the unit relative to adjacent units.

2. A shearing device as set forth in claim 1 wherein each pivotal connecting means includes an element projecting laterally of one of the adjacent units and having an arcuate surface swung about an axis coinciding with the alined and substantially engaged ends of the blades and dies of the adjacent units, the other of said adjacent units having a complementary recess for receiving the element whereby said adjacent units are adjusted by pivotal movement about the axis coinciding with the alined and substantially engaged ends of their blades and dies.

3. A shearing device including, a plurality of punch and die units mounted in side-by-side relationship, the punch of each unit including a blade having a shearing edge, the die of each unit having a coacting shear surface in substantial alinement with the shearing edge of its blade, and means between and adjustably connecting adjacent units with the adjacent ends of the shearing edges of their blades and the coacting surfaces of their dies in substantially alined engagement, each connecting means being in alinement with the alined and substantially engaged blade and die ends of adjacent units whereby adjacent units may be adjusted to vary the angular relation of their blade edges and die surfaces without misalining or substantially disengaging said blade and die ends, each unit having at least one end portion of a width less than the length of its blade and die to permit adjustable movement of the unit relative to adjacent units.

4. A shearing device as set forth in claim 3 wherein each connecting means includes an element carried by and projecting laterally from one of adjacent units, the element having a semi-circular surface swung in an arc about an axis coincident with the alined and substantially engaged blade and die ends of the adjacent units, the other of said adjacent units having a complementary recess in its adjacent side for receiving the element whereby said adjacent units are adjusted by pivotal movement about the coincident axis.

5. A shearing device as set forth in claim 3 wherein each connecting means includes a circular element, the adjacent units having complementary semi-circular recesses in their adjacent sides swung in arcs about an axis coincident with the alined and substantially engaged blade and die ends, the element being confined in the recesses whereby said adjacent units are adjusted by pivotal movement about the coincident axis.

6. A shearing device as set forth in claim 3 wherein the die of each unit is adjustably mounted for positioning and maintaining its shear surface in substantial alinement with the shearing edge of its blade.

7. A shearing device as set forth in claim 3 including, flexible means extending through the units in alinement with their alined and engaged blade and die ends for securing said units together and permitting adjustment of said units, and means fastening said units in adjusted positions.

References Cited in the file of this patent

UNITED STATES PATENTS

| Number | Name | Date |
|---|---|---|
| 232,647 | Lewis | Sept. 28, 1880 |
| 441,262 | Valiant | Nov. 25, 1890 |
| 1,239,289 | Mintz | Sept. 4, 1917 |
| 2,100,846 | Halstead | Nov. 30, 1937 |
| 2,100,847 | Halstead | Nov. 30, 1937 |
| 2,118,110 | Rosenberg | May 24, 1938 |
| 2,323,431 | Wales | July 6, 1943 |